United States Patent
Yu (10) Patent No.: US 7,701,828 B2
(45) Date of Patent: Apr. 20, 2010

(54) OPTICAL RECORDING SYSTEM AND METHOD

(75) Inventor: Chih-Ching Yu, Dayuan Shiang (TW)

(73) Assignee: Mediatek Inc., Hsin-Chu (TW)

( * ) Notice: Subject to any disclaimer, the term of this patent is extended or adjusted under 35 U.S.C. 154(b) by 1173 days.

(21) Appl. No.: 11/051,319

(22) Filed: Feb. 4, 2005

(65) Prior Publication Data

US 2006/0176795 A1 Aug. 10, 2006

(51) Int. Cl.
G11B 7/0045 (2006.01)
(52) U.S. Cl. .................................... 369/59.12
(58) Field of Classification Search ........................ None
See application file for complete search history.

(56) References Cited

U.S. PATENT DOCUMENTS 5,327,411 A * 7/1994 Iwasa et al. .............. 369/59.12
7,158,461 B1 * 1/2007 Seo et al. ................. 369/59.12
7,280,455 B2 * 10/2007 Ohkubo .................... 369/59.21
2004/0081052 A1 4/2004 Miyamoto et al.
2004/0156292 A1 8/2004 Seo et al.

* cited by examiner

Primary Examiner—Joseph H Feild
Assistant Examiner—Parul Gupta
(74) Attorney, Agent, or Firm—Thomas, Kayden, Horstemeyer & Risley (57) ABSTRACT

An optical recording system and method. A radiation source provides a radiation beam writing marks separated by spaces on a rewritable optical disc. A pulse generator generates a recording pulse signal based on a preset data signal to drive the radiation source, wherein the recording pulse signal comprises a cooling pulse, and wherein the preset data signal corresponds to a mark and space of equal length and is recorded onto the rewritable optical disc in terms of a written mark and space. A pulse controller determines a final width for the cooling pulse according to a difference between lengths of the written mark and the written space.

27 Claims, 6 Drawing Sheets

OPTICAL RECORDING SYSTEM AND METHOD

BACKGROUND

The invention relates to data recording on an optical information carrier, and more particularly to a system and method of writing marks corresponding to recording data on a recording surface.

Information is recorded onto a recordable optical information carrier such as a DVD-R (DVD-recordable) or a DVD-RW (DVD-rewritable) by projecting a laser beam onto the recording surface. At the contact areas, the properties of the optical recording medium are physically changed by increased temperature. This generates recording marks on the recording surface.

The laser beam is modulated by recording pulses having time widths corresponding to information to be recorded, such that laser pulses having lengths corresponding to information to be recorded are generated and projected onto the optical information carrier.

Often, a series of pulses comprising a plurality of short pulses, rather than a single laser pulse is used. An employed "write strategy" introduces less heat accumulation on the recording surface compared to the conventional method, such that uniform temperature distribution can be achieved on the recording surface on which the recording marks are formed. This can prevent undesired teardrop-shaped recording marks enabling formation of recording marks of preferred shape.

In the case of DVD-RW, for example, each mark representing data is written by a sequence of one or more pulses, the last of which descends from a write power level to a cooling power level, which sustains for a cooling period before it ascends to an erasing power level. Marks are written by the pulses at the write power level. Erasure of previous marks in the spaces between presently written marks is accomplished by irradiation at the erasing power level. The cooling period following the last pulse of the sequence and preceding the start of the erasure cools the recording surface at the end of the sequence. The duration of the cooling period is a key point in the write strategy, enabling formation of recording marks of preferred shape and length. If the cooling period is too short, erasure starts too soon and erases too much of the just written mark. If, on the other hand, the cooling period is too long, the erasure starts too late and previously written marks immediately following recently written marks will not be erased. Optimum cooling period is influenced by many factors, such as write speed and physical characteristics of the recording surface and the optical information carrier, creating great differences in write strategy when recording marks on different recording surfaces under different conditions.

A conventional technique for obtaining an optimum write strategy is to provide a disc having information on the recording power and the write strategy reflecting characteristics thereof.

SUMMARY

Embodiments of the invention provide an optical recording system comprising a radiation source, pulse generator, and a pulse controller. The radiation source provides a radiation beam writing marks separated by spaces on a rewritable optical disc. The pulse generator generates a recording pulse signal based on a preset data signal to drive the radiation source, wherein the recording pulse signal comprises a cooling pulse, and wherein the preset data signal corresponds to a mark and space of equal length and is recorded onto the rewritable optical disc in terms of a written mark and space. The pulse controller determines a final width for the cooling pulse according to a difference between lengths of the written mark and the written space.

Also disclosed is an optical recording system. The optical recording system comprises a radiation source, a pulse generator, and a pulse controller. The radiation source provides a radiation beam writing a combination of marks and spaces representing data onto a recording surface of a rewritable optical disc. The pulse generator generates a recording pulse signal based on a preset data signal to drive the radiation source, wherein the recording pulse signal comprises a cooling pulse, and wherein the preset data signal is recorded onto the rewritable optical disc in terms of a written mark and space. The pulse controller determines a final width for the cooling pulse according to a difference between lengths of a desired mark concerning the data signal and a corresponding written mark on the rewritable optical disc.

Also disclosed is an optical recording method. A preset data signal corresponding a mark and space of equal length is provided. A recording pulse signal is generated based on the preset data signal, wherein the recording pulse signal comprises a cooling pulse of variable width. The preset data signal is recorded onto a rewritable optical disc in terms of a written mark and space using the recording pulse signal. Lengths of the written mark and the written space on the rewritable optical disc are measured. A final width for the cooling pulse is determined according to a difference between lengths of the written mark and the written space.

Also disclosed is an optical recording method. A preset data signal is provided. A recording pulse signal is generated based on the preset data signal, wherein the recording pulse signal comprises a cooling pulse of variable width. The preset data signal is then recorded onto a rewritable optical disc in terms of a written mark and space using the recording pulse signal. The length of the written mark corresponding to a desired mark concerning the preset data signal is measured. A final width for the cooling pulse is then determined according to a difference between lengths of the written mark and the desired mark.

DESCRIPTION OF THE DRAWINGS

The invention can be more fully understood by reading the subsequent detailed description and examples with references made to the accompanying drawings, wherein.

DETAILED DESCRIPTION

Embodiments of the invention are now described with reference to FIGS. 1 through 6, which generally relate to determining a recording condition by performing a test recording before recording information on an optical storage medium of the phase-change type, such as CD-RW, DVD-RW, DVD+RW, and DVD-RAM. While a DVD-RW is used here for description purpose, it is understood that the information carrier used by the recording system is not critical, and any recording system recording data using a recording pulse signal having a cooling pulse width may be readily substituted.

In the following detailed description, reference is made to the accompanying drawings which form a part hereof, and in which is shown by way of illustration of specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense, and the scope of the present invention is only defined by the appended claims. The leading digit(s) of reference numbers appearing in the Figures corresponds to the Figure number, with the exception that the same reference number is used throughout to refer to an identical component which appears in multiple Figures.

Figure 1:
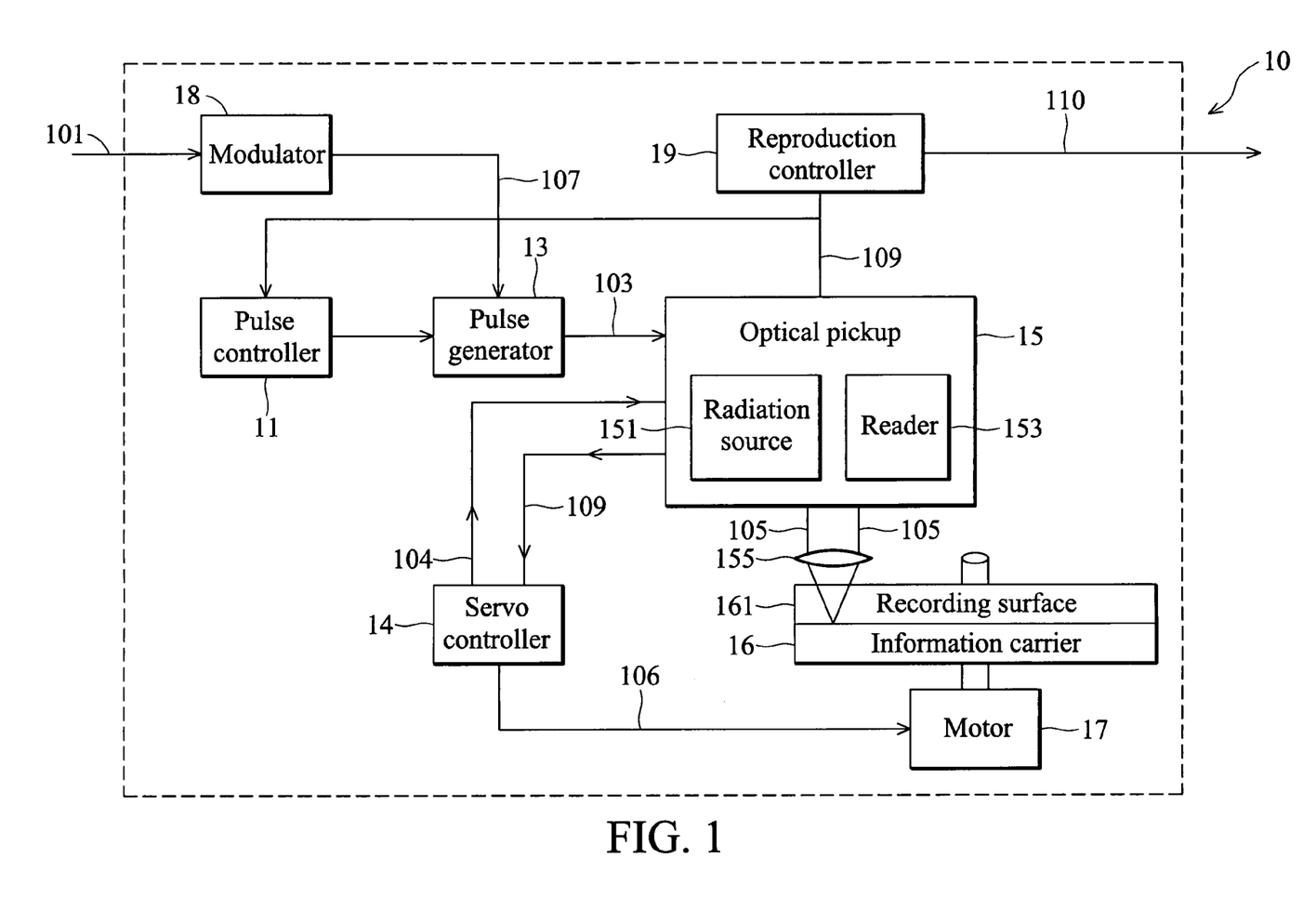
FIG. 1 is a schematic view of an embodiment of an optical recording system.
Figure 3:
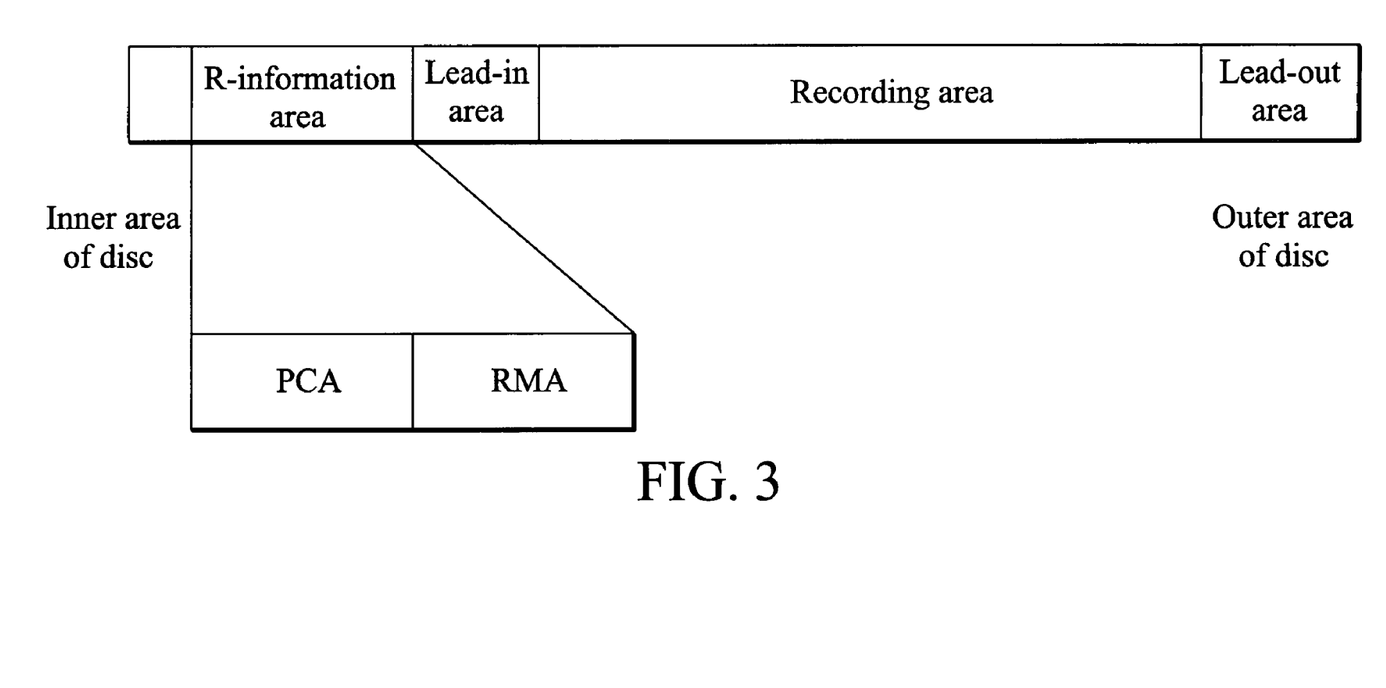
FIG. 3 schematically shows a recording format of an optical information carrier.

FIG. 1 is a schematic view of an optical recording system according to embodiments of the invention, which records data by writing marks to a recording surface of an optical information carrier, and reproducing data therefrom. The optical information carrier can be, for example, a DVD-RW allowing repeated erasure and recording (as shown in FIG. 3). System 10 comprises pulse controller 11, pulse generator 13, optical pickup 15, modulator 18, reproduction controller 19, servo controller 14, and motor 17. The optical pickup 15 comprises a radiation source 151 and a reader 153.

Figure 2:
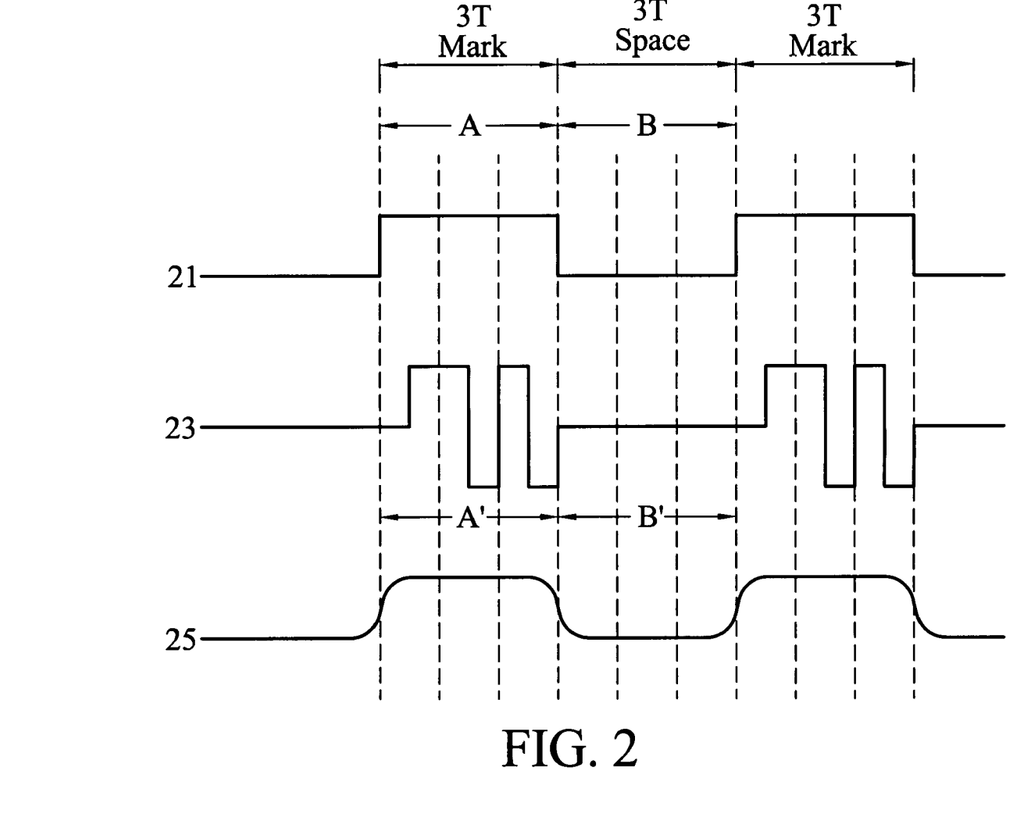
FIG. 2 illustrates waveforms helpful in understanding an exemplary embodiment of an optical recording method.

In system 10, a data signal 101 comprising the information to be recorded is transmitted to a modulator 18. Pulse controller 11 controls a pulse generator 13 to generate a recording pulse signal 103, thereby driving a radiation source 151 to provide a radiation beam 105 writing marks representing data corresponding to data signal 101 to recording surface 161. The recording pulse signal 103 alternates between values representing a write level, an erase level, and a cooling level (as shown in FIG. 2). The pulse controller 11 determines a width of the cooling pulse based on a difference between a written mark length and a desired mark length corresponding to the data signal. The pulse generator 13 adjusts a leading edge of the cooling pulse so that the recording pulse signal bears the cooling pulse having the final width determined by the pulse controller. The radiation beam 105 is focused by lens 155 onto a recording surface 161 of an information carrier 16 in the form of a disc. The information carrier 16 is rotated around its center by a motor 17. Modulator 18 generates EFM signal 107 according to data signal 101 and transmits the EFM signal 107 to pulse generator 13. Pulse controller 11 directs pulse generator 13 to generate recording pulse signal 103 according to EFM signal 107. The recording pulse signal 103 contains at least a sequence of write pulses followed by a cooling pulse and then an erase pulse.

A reproduction controller 19 receives a read signal 109 from reader 153, and performs predetermined processing thereon, such as demodulating and decoding, to generate and output reproduced data 110.

The servo controller 14 receives read signal 109 from reader 153. Based on the read signal 109, servo controller 14 generates a servo signal 104, such as a tracking error signal or a focus error signal, on the optical pickup 15, and provides a spindle servo signal 106 to the motor 17.

Embodiments of the disclosure mainly relate to the recording operations, the reproduction controller 19 and servo controller 14, therefore, are not described in detail here. Additionally, although FIG. 1 illustrates an optical recording system capable of information recording and reproducing, the disclosure may also be applied to a system dedicated to information recording.

FIG. 2 illustrates waveforms helpful in understanding an exemplary embodiment of an optical recording method. Waveform 21 illustrates the value of a digital data signal as a function of time, the value of the signal representing information to be recorded. The vertical dashed line indicates transitions in a clock signal of a data clock with respect to the data signal. The period of the data clock, also referred to as channel-bit period, is indicated by T. The data signal changes values from 'high' to 'low' and 'low' to 'high' at transitions of the data clock. The data signal is an Eight-to-Fourteen-Modulation (EFM) coded data signal, which can be either 'low' or 'high' for periods from 3T to 11T. According to the exemplary embodiment, the data signals have marks and spaces of equal lengths. Referring to FIG. 2, waveforms 21 illustrates a 3T pattern of which mark length A and space length B are 3T. Length for marks and spaces is not limited to 3T; it may be a value between 3T and 11T. When recording a data signal, a 'high' period is recorded as a mark having a length corresponding to the duration or width of the 'high' period, and a 'low' period is recorded as a 'space', an unwritten area between marks, and having a length corresponding to the duration or width of the 'low' period.

The data is written to a recording surface of an optical information carrier. The marks representing the data are written along a track in the recording surface by a light beam. The marks are areas of the recording surface having optical characteristics different from their surroundings, enabling optical reading of the marks possible. The length of a mark formed on the recording surface is substantially equal to the number of channel-bit period of the data signal timing the write speed. The length of a mark can be expressed in channel-bit lengths, and one channel-bit length being equal to one channel-bit period times the write speed. Waveform 25 reflects marks and spaces that are written on the recording surface in accordance with the data signal illustrated by waveform 21. Mark length A' and space length B' of waveform 25 correspond to mark length A and space length B of waveform 21. Ideally, mark length A' is equal to space length B' provided that mark length A and space length B are equal. In reality, however, mark length A' and space length B' are slightly different. Embodiments here are implemented to reduce the difference between mark length A' and space length B'. Waveform 23 illustrates a recording pulse signal corresponding to the data signal and modulating the power of a radiation beam with which the marks are formed on the recording surface. The trace shows a sequence of write pulses for writing the 3T-mark specified by the data signal. The value of recording pulse signal alternates between values representing a write level, an erase level, and a cooling level. The period directly following the last pulse of a write sequence, during which the radiation power is at the cooling level, is called the cooling pulse width. The cooling pulse width is initially set, and subsequently adjusted by means of the method illustrated in FIG. 4.

The processes for determining the recording condition, including the cooling pulse width, is described here. The system 10 determines a recommended recording condition by performing a test recording prior to the recording of user data on the recording surface.

In FIG. 3, areas on the recording surface used in the test recording are illustrated. FIG. 3 schematically shows a format of a recording surface. The recording surface is divided into several parts, comprising R-information area, lead-in area, recording area, and lead-out area. The R-information area accepts data on the recording surface, and comprises Power Calibration Area (PCA) and Recording Management Area (RMA). Generally, each disc comprises information pertaining to the recording power and the write strategy specifying suitable recording pulse signals reflecting its own characteristics (hereinafter referred to as 'recording condition information'). For example, the recording condition information is included in Land Pre-Pit (LPP) information and recorded on the disc as LPPS, or alternatively, the recording condition information is stored in a microprocessor of a recording system. In the exemplary embodiment, manufacturer ID is recorded on the disc, and the recording condition information is stored in the microcomputer of the recording system accordingly. The preset recording condition information is determined according to average characteristics of a particular type of optical information carrier. The recording condition information recorded on the disc is a condition provided by a manufacturer of the disc, and can be essentially regarded as the optimum recording condition for the disc. This preset recording condition information cannot guarantee recording quality due to variations in different recording systems.

To record data onto an optical information carrier with a new manufacturer ID, a test recording is performed to determine recommended recording condition information according to recording operations of corresponding recording system. The test recording can be performed in PCA or other area on the recording surface.

Figure 4:
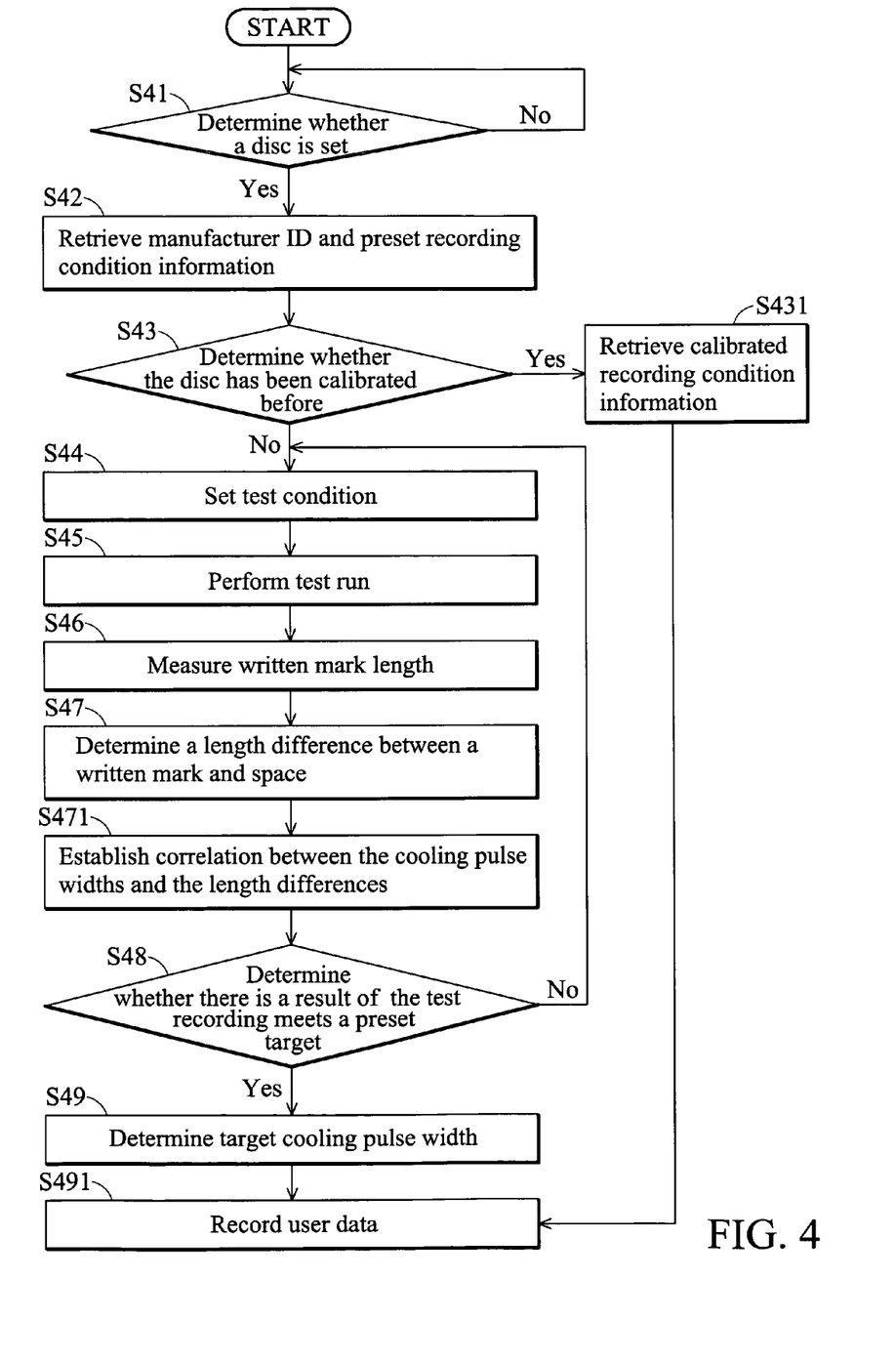
FIG. 4 is a flowchart showing an embodiment of an optical recording method.

Referring to FIG. 4, it is determined whether an optical recording carrier (a disc) is present in the optical recording system (step S41), and if so, manufacturer ID and preset recording condition information of the disc carrier are retrieved (step S42). The preset recording condition information pertains to write strategy and laser power appropriate for recording information on the disc. For example, the recording condition information can specify pulse widths of writing pulses and cooling pulses, as well as the power level for the write level, cooling level, and erase level. In step S43, it is determined, based on the manufacturer ID of the disc, whether the disc belongs to a disc type that has been calibrated before in the recording system, and if so, calibrated recording condition information is retrieved (step S431), and the process proceeds to step S491. If the disc cannot be identified as a disc type that has been calibrated before in the recording system, a test recording is performed to calibrate the recording condition information thereof. In step S44, a test condition is set for a particular T-length mark/space. The preset recording condition information can be used as an initial test condition. The test condition can be further modified for various cooling pulse widths. For example, if the recording condition information obtained in step S42 specifies the cooling pulse width as 0.6T, a test condition for an initial test run uses a cooling pulse width of 0.6T, and adapts 0.7T or other values of cooling pulse widths differing slightly from the preset cooling pulse widths in subsequent test runs. In step S45, a test run is performed according to the test condition determined in step S44. The test recording records test data on PCA or other areas of the recording surface. In step S46, at least one written mark is measured to obtain the mark length thereof. In step S47, a length difference between the written mark and space corresponding to the test data is calculated. The length of a written mark and that of a space are determined from eight-to-fourteen-modulated (EFM) data signal corresponding to the test data. In step S471, the correlation between every cooling pulse width and the corresponding length difference is established. In step S48, it is determined whether a result of the test recording meets a preset target. The preset target can specify a value for the difference in mark length, a change rate of the difference while varying the cooling pulse width, or other criteria. Instead of using a preset target to determine a particular value of difference, some embodiments intend to find the smallest difference among all results of the test recording in step S48. When the smallest difference of length is found, the method proceeds to step S49. Alternatively, the minimum change rate of difference can be searched in step S48, and when found, the method proceeds to step S49. If one result of the test recording meets the preset target, the process proceeds to step S49, otherwise the process returns to step S44. In step S49, a target cooling pulse width is determined according to the correlation established in step S471. The pulse generator adjusts a leading edge of the cooling pulse so that the recording pulse signal bears the cooling pulse having the final width determined by the pulse controller. The steps S44 through S49 are repeatedly performed for marks/spaces of other length. In step S49 1, user data is written to the recording area of recording surface according to a write strategy using the target cooling pulse width.

Figure 5:
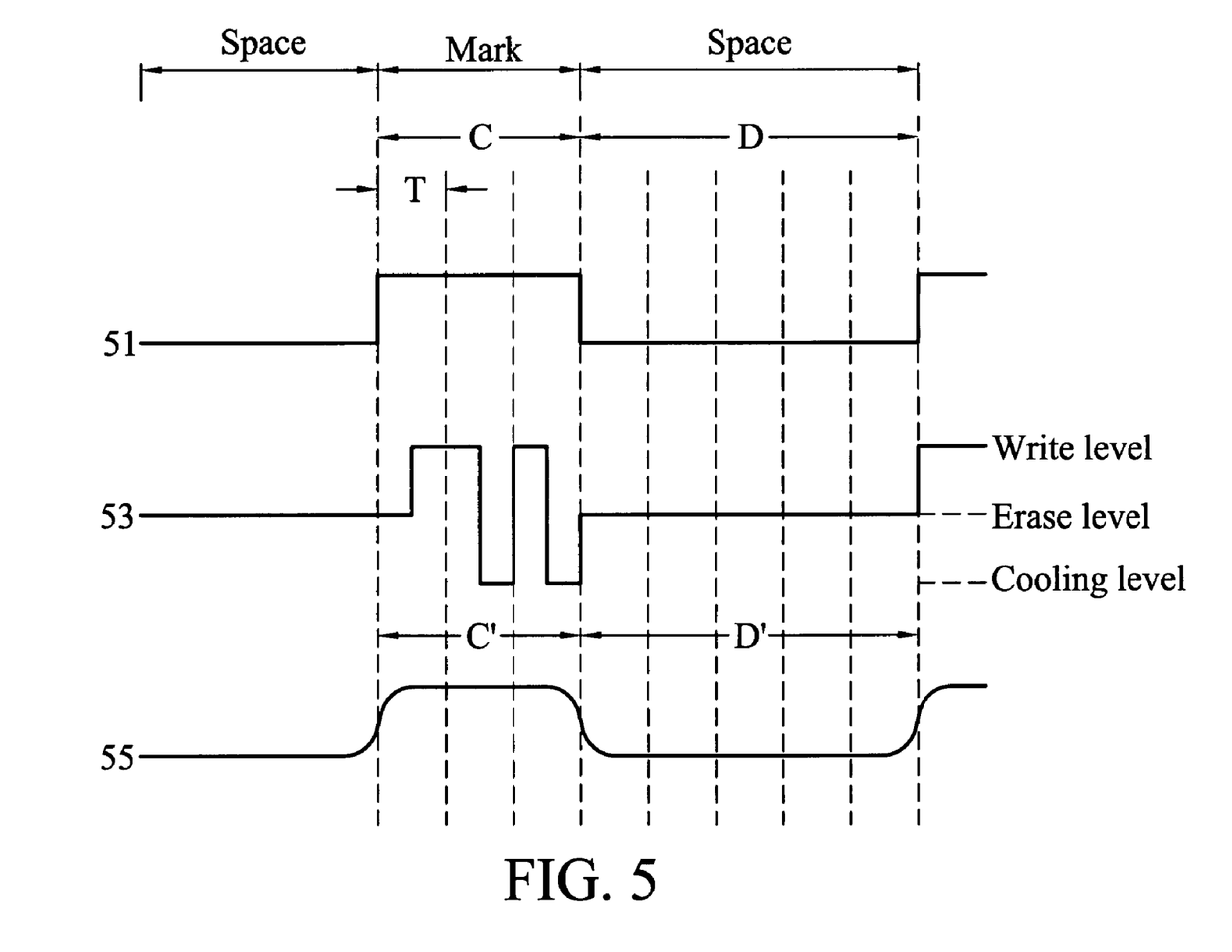
FIG. 5 illustrates waveforms helpful in understanding another embodiment of an optical recording method.

FIG. 5 illustrates waveforms helpful in understanding another embodiment of an optical recording method. Waveform 51 illustrates the value of a digital data signal as a function of time, the value of the signal representing information to be recorded. The data signal is an Eight-to-Fourteen-Modulation (EFM) coded data signal, which can be either 'low' or 'high' for periods from 3T to 11T. According to this embodiment, the data signals have marks and spaces of different lengths. Referring to FIG. 5, lengths for the mark and space are 3T and 5T, respectively. Waveform 55 reflects marks and spaces that are written on the recording surface in accordance with the data signal illustrated by waveform 51. Mark length C' and space length C' of waveform 55 correspond to mark length C and space length D of waveform 51. Ideally, mark length C' is equal to mark length C and space length D' is equal to space length D. In reality, however, mark length C' and space length D' are slightly different to mark length C and space length D.

Figure 6:
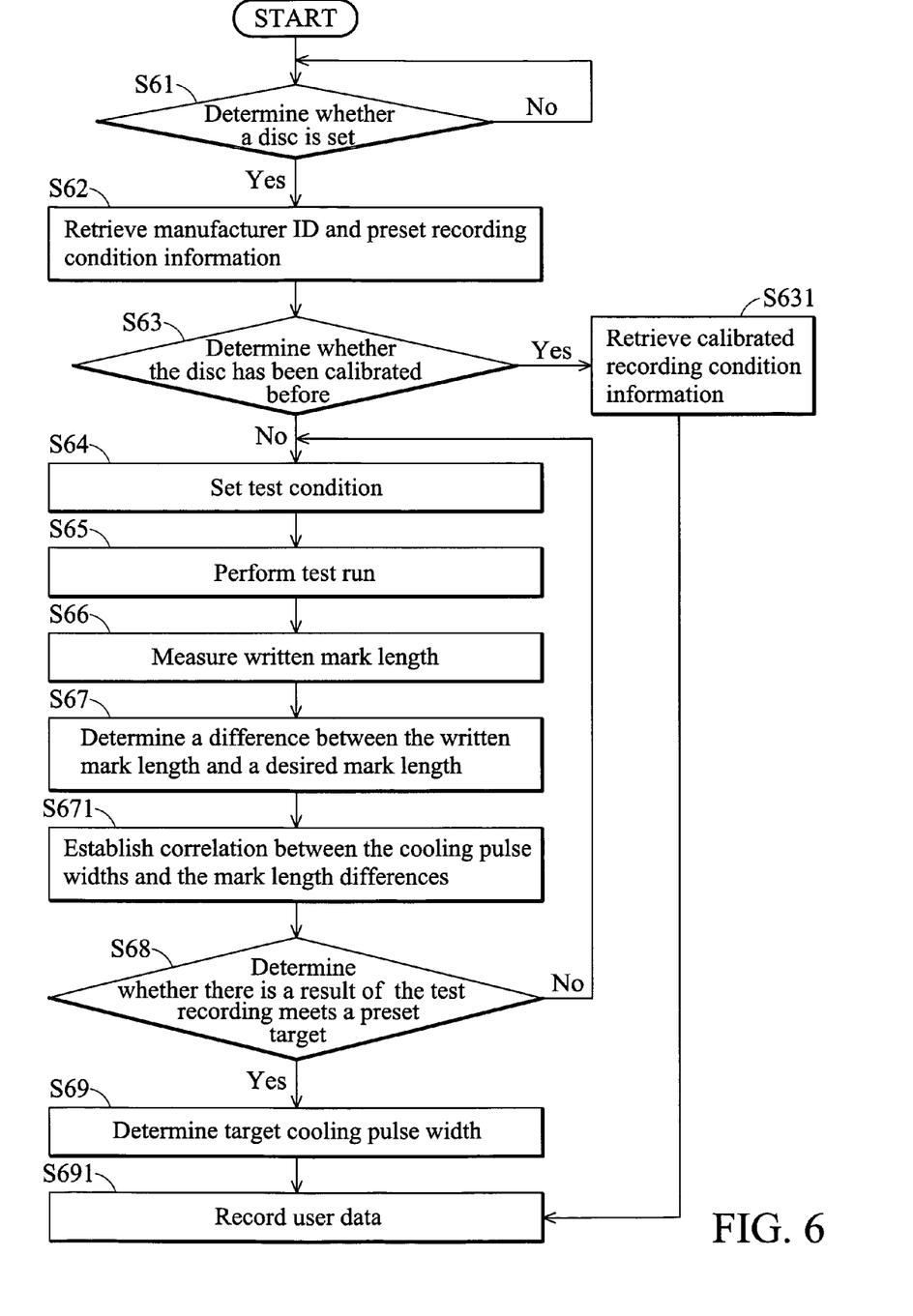
FIG. 6 is a flowchart showing an embodiment of an optical recording method.

In FIG. 5, waveform 53 illustrates a recording pulse signal corresponding to the data signal and modulating the power of a radiation beam with which the marks are formed on the recording surface. The cooling pulse width is initially set, and subsequently adjusted by means of the method illustrated in FIG. 6. Referring to FIG. 6, it is determined whether an optical recording carrier (a disc) is present in the optical recording system (step S61), and if so, manufacturer ID and preset recording condition information of the disc carrier are retrieved (step S62). The preset recording condition information pertains to write strategy and laser power appropriate for recording information on the disc. For example, the recording condition information can specify pulse widths of writing pulses and cooling pulses, as well as the power level for the write level, cooling level, and erase level. In step S63, it is determined, based on the manufacturer ID of the disc, whether the disc belongs to a disc type that has been calibrated before in the recording system, and if so, calibrated recording condition information is retrieved (step S631), and the process proceeds to step S691. If the disc cannot be identified as a disc type that has been calibrated before in the recording system, a test recording is performed to calibrate the recording condition information thereof. In step S64, a test condition is set for a particular T-length mark. The preset recording condition information can be used as an initial test condition. The test condition can be further modified for various cooling pulse widths. For example, if the recording condition information obtained in step S62 specifies the cooling pulse width as 0.6T, a test condition for an initial test run uses a cooling pulse width of 0.6T, and adapts 0.7T or other values of cooling pulse widths differing slightly from the preset cooling pulse widths in subsequent test runs. In step S65, a test run is performed according to the test condition determined in step S64. The test recording records test data on PCA or other areas of the recording surface. In step S66, at least one written mark is measured to obtain the mark length thereof. In step S67, a difference between the written mark length and a desired mark length corresponding to the test data is calculated. The desired mark length is determined from the eight-to-fourteen-modulated (EFM) signal 107 corresponding to the test data, or from a PLL-sampled signal 109 corresponding to the test data, where PLL is abbreviated from phase-locked loop. In step S671, the correlation between every cooling pulse width and the corresponding mark length difference is established. In step S68, it is determined whether a result of the test recording meets a preset target. The preset target can specify a value for the difference in mark length, a change rate of the difference while varying the cooling pulse width, or other criteria. Instead of using a preset target to determine a particular value of difference, some embodiments intend to find the smallest difference among all results of the test recording in step S68. When the smallest difference of length is found, the method proceeds to step S69. Alternatively, the minimum change rate of difference can be searched in step S68, and when found, the method proceeds to step S69. If one result of the test recording meets the preset target, the process proceeds to step S69, otherwise the process returns to step S64. In step S69, a target cooling pulse width is determined according to the correlation established in step S671. The steps S64 through S69 are repeatedly performed for marks of other length. In step S691, user data is written to the recording area of recording surface according to a write strategy using the target cooling pulse width.

In the above described example, the cooling pulse length is adjusted according to differences between the measured length of the marks and desired lengths thereof according to the test data. Lengths of the spaces between the marks can also be incorporated into the correlation establishment. In other embodiments, correlation establishment can use the lengths of the spaces rather than those of the marks.

While specific test data is used in the disclosed test recording, test data is not limited thereto, whereby actual recording data can also be used.

The methods and system of embodiments of the invention, or certain aspects or portions thereof, may take the form of program code (i.e., instructions) embodied in tangible media, such as floppy diskettes, CD-ROMS, hard drives, non-volatile memory, or any other machine-readable storage medium, wherein, when the program code is loaded into and executed by a machine, such as a computer, the machine becomes an, apparatus for practicing the disclosure. The methods and apparatus disclosed may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing embodiments of the invention. When implemented on a general-purpose processor, the program code combines with the processor to provide a unique apparatus that operates analogously to specific logic circuits.

While the invention has been described by way of example and in terms of the preferred embodiment, it is to be understood that the invention is not limited thereto. To the contrary, it is intended to cover various modifications and similar arrangements (as would be apparent to those skilled in the art) Therefore, the scope of the appended claims should be accorded the broadest interpretation so as to encompass all such modifications and similar arrangements.

What is claimed is:

1. An optical recording system, comprising:
   a radiation source providing a radiation beam writing marks separated by spaces on a rewritable optical disc;
   a pulse generator generating a recording pulse signal based on a preset data signal to drive the radiation source, wherein the recording pulse signal comprises a cooling pulse, and wherein the preset data signal corresponds to a mark and space of equal length and is recorded onto the rewritable optical disc in terms of a written mark and space; and
   a pulse controller determining a cooling period for the cooling pulse according to a difference between lengths of the written mark and the written space, wherein the written mark and written space are already written onto the rewritable optical disc.

2. The system of claim 1, wherein the pulse generator varies the width of the cooling pulse of the recording pulse signal for the mark and the space of a particular length, and wherein the pulse controller measures lengths of written mark and space with respect to the varied cooling pulse, calculates a difference between the measured lengths of the written mark and space, and for the mark of the particular length, establishes a correlation between differences and all variable widths of the cooling pulse.

3. The system of claim 2, the cooling period-is determined by the correlation of which a smallest difference corresponds to one of the variable cooling pulse widths.

4. The system of claim 2, the cooling is determined by the correlation in which a minimum change rate of difference corresponds to one of the cooling pulse widths.

5. The system of claim 1, wherein the pulse generator adjusts a leading edge of the cooling pulse so that the recording pulse signal bears the cooling pulse having the cooling period determined by the pulse controller.

6. An optical recording system, comprising:
   a radiation source providing a radiation beam writing a combination of marks and spaces representing data onto a recording surface of a rewritable optical disc;
   a pulse generator generating a recording pulse signal based on a preset data signal to drive the radiation source, wherein the recording pulse signal comprises a cooling pulse, and wherein the preset data signal is recorded onto the rewritable optical disc in terms of a written mark and space; and
   a pulse controller determining a cooling period for the cooling pulse according to a difference between lengths of a desired mark concerning the data signal and a corresponding written mark on the rewritable optical disc, wherein the written mark and written space are already written onto the rewritable optical disc.

7. The system of claim 6, wherein the pulse generator varies the width of the cooling pulse for the desired mark of a particular length, and wherein the pulse controller measures the length of the corresponding written mark when varying the cooling pulse, calculates a difference between the measured length of the written mark and the particular length, and establishes a correlation between differences and all variable widths of the cooling pulse for the desired mark.

8. The system of claim 7, wherein the cooling period is determined by the correlation of which a smallest difference corresponds to one of the variable cooling pulse widths.

9. The system of claim 7, wherein the cooling period is determined by the correlation in which a minimum change rate of difference corresponds to one of the variable cooling pulse widths.

10. The system of claim 6, wherein the desired mark length is derived from the data signal subjected to eight-to-fourteen-modulation.

11. The system of claim 6, wherein the desired mark length is derived from the data signal subjected to phase-locked loop sampling.

12. The system of claim 6, wherein the pulse generator adjusts a leading edge of a cooling pulse so that the recording pulse signal bears the cooling pulse having the cooling pulse width determined by the pulse controller.

13. The system of claim 7, wherein the pulse controller further measures lengths of spaces between marks, and incorporates the space length measures into the correlation establishment.

14. An optical recording method, comprising:
providing a preset data signal corresponding a mark and space of equal length;
generating a recording pulse signal based on the preset data signal, wherein the recording pulse signal comprises a cooling pulse of variable width;
recording the preset data signal onto a rewritable optical disc in terms of a written mark and space using the recording pulse signal;
measuring lengths of the written mark and the written space on the rewritable optical disc;
determining a cooling period for the cooling pulse according to a difference between lengths of the written mark and the written space, wherein the written mark and written space are already written onto the rewritable optical disc.

15. The method of claim 14 further comprising:
varying the width of the cooling pulse for the mark and the space of a particular length;
measuring lengths of written mark and space with respect to the varied cooling pulse;
calculating a difference between the measured lengths of the written mark and space; and
for the mark of the particular length, establishing a correlation between differences and all variable widths of the cooling pulse.

16. The method of claim 15, wherein the cooling period-is determined by the correlation of which a smallest difference corresponds to one of the variable cooling pulse widths.

17. The method of claim 15, wherein the cooling period is determined by the correlation in which a minimum change rate of difference corresponds to one of the variable cooling pulse widths.

18. The method of claim 14 further comprising generating the recording pulse signal that bears the cooling pulse having the cooling period by adjusting a leading edge of the cooling pulse.

19. An optical recording method, comprising:
providing a preset data signal;
generating a recording pulse signal based on the preset data signal, wherein the recording pulse signal comprises a cooling pulse of variable width;
recording the preset data signal onto a rewritable optical disc in terms of a written mark and space using the recording pulse signal;
measuring the length of the written mark corresponding to a desired mark concerning the preset data signal;
determining a cooling period for the cooling pulse according to a difference between lengths of the written mark and the desired mark, wherein the written mark and written space are already written onto the rewritable optical disc.

20. The method of claim 19 further comprising:
varying the width of the cooling pulse for the desired mark of a particular length;
measuring the length of the corresponding written mark when varying the cooling pulse;
calculating a difference between the measured lengths of the written mark and the particular length, and
establishing a correlation between differences and all variable widths of the cooling pulse for the desired mark.

21. The method of claim 20, wherein the cooling period is determined by the correlation of which a smallest difference corresponds to one of the variable cooling pulse widths.

22. The method of claim 20, wherein the cooling period is determined by the correlation in which a minimum change rate of difference corresponds to one of the variable cooling pulse widths.

23. The method of claim 19, wherein the desired mark length is derived from the data signal subjected to eight-to-fourteen-modulation.

24. The method of claim 19, wherein the desired mark length is derived from the data signal subjected to phase-locked loop sampling.

25. The method of claim 19 further comprising generating the recording pulse signal that bears the cooling pulse having the cooling period by adjusting a leading edge of the cooling pulse.

26. The method of claim 19 further comprising writing marks and spaces representing user data through the recording pulse signal bearing the cooling pulse having the cooling period.

27. The method of claim 20 further comprising measuring length of spaces between marks, and incorporating the space length measures into the correlation establishment.

* * * * *